United States Patent [19]
Berkman

[11] Patent Number: 6,106,716
[45] Date of Patent: Aug. 22, 2000

[54] SYSTEM FOR PURIFICATION OF DOMESTIC HOUSEHOLD EFFLUENT

[76] Inventor: Eliezer Berkman, 100 HaRoah Street, 52401 Ramat Gan, Israel

[21] Appl. No.: 09/381,030
[22] PCT Filed: Mar. 29, 1998
[86] PCT No.: PCT/IL98/00147
§ 371 Date: Sep. 15, 1999
§ 102(e) Date: Sep. 15, 1999
[87] PCT Pub. No.: WO98/43918
PCT Pub. Date: Oct. 8, 1998

[30] Foreign Application Priority Data

Apr. 1, 1997 [IL] Israel ............................. 120583

[51] Int. Cl.⁷ .................. C02F 3/02; C02F 3/28; C02F 3/30; C02F 9/00
[52] U.S. Cl. .......... 210/603; 210/605; 210/607; 210/611; 210/613; 210/624; 210/626; 210/629; 210/630; 210/177; 210/180; 210/195.1; 210/195.3; 210/197; 210/202; 210/205; 210/253; 210/259; 210/258
[58] Field of Search .................. 210/603, 605, 210/607, 611, 613, 624, 626, 629, 630, 195.1, 194, 195.3, 197, 202, 205, 253, 259, 257.1, 258, 177, 180

[56] References Cited

U.S. PATENT DOCUMENTS

| | | |
|---|---|---|
| 4,172,034 | 10/1979 | Carlsson et al. . |
| 4,812,237 | 3/1989 | Cawley et al. . |
| 5,114,586 | 5/1992 | Humphrey . |
| 5,137,636 | 8/1992 | Bundgaard . |
| 5,342,523 | 8/1994 | Kumashima . |
| 5,916,437 | 6/1999 | Levitin . |
| 5,938,918 | 8/1999 | Kidd . |

*Primary Examiner*—Thomas M. Lithgow
*Attorney, Agent, or Firm*—Baker Botts L.L.P.

[57] ABSTRACT

The invention provides a system 10 for treatment and purification of domestic household effluent, and for the elimination within said system of organic solid wastes, comprising elements 12 and 14 for separately collecting first and second constituents of the sewage of a domestic residential unit, lavatory sewage comprising said first sewage constituent, and bath, shower, wash basin, laundry, kitchen sink sewage and the like comprising said second sewage constituent, a first and a second dual-purpose vessel 22 and 24, each vessel having at least one inlet port 18 and 20 and at least one outlet port 26, 28, 30, 32 and being arranged so that during the time period that one of said vessels 22 receives said first sewage constituent and acts as a collector and settling tank, the remaining vessel 24 operates as an anaerobic reaction vessel, the vessel operating as an anaerobic reaction vessel carrying out a decomposition process during which the volume of sludge 34 contained therein is greatly reduced by conversion to compost and gas, a gas outlet 30, 32 being provided at the top of each of said vessels for the collection thereof, first valve means 16 for directing said first sewage constituent to whichever dual-purpose vessel 22, 24 is currently used as a collector and settling tank and for isolating the remaining dual-purpose vessel to convert the same to operate as an anaerobic reaction vessel, at least one aerobic reaction vessel 40 connected to receive an aqueous slurry containing floating organic solids from said collector and settling tank 22, at least one aerator 42 connected to said aerobic reaction vessel 40 for oxygenating said slurry, first pumping means 44, powered at least in part by gas generated in said anaerobic reaction vessel 24, for repeatedly driving said slurry from said aerobic reaction vessel 40 through said aerator 42.

19 Claims, 4 Drawing Sheets

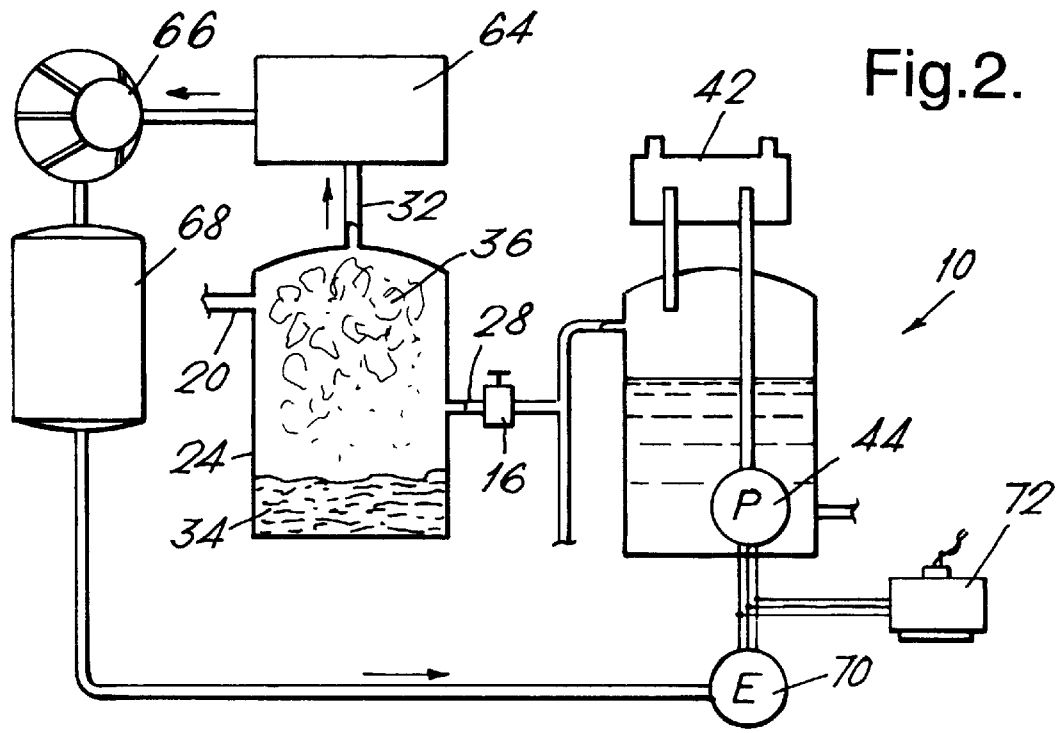
Fig.2.
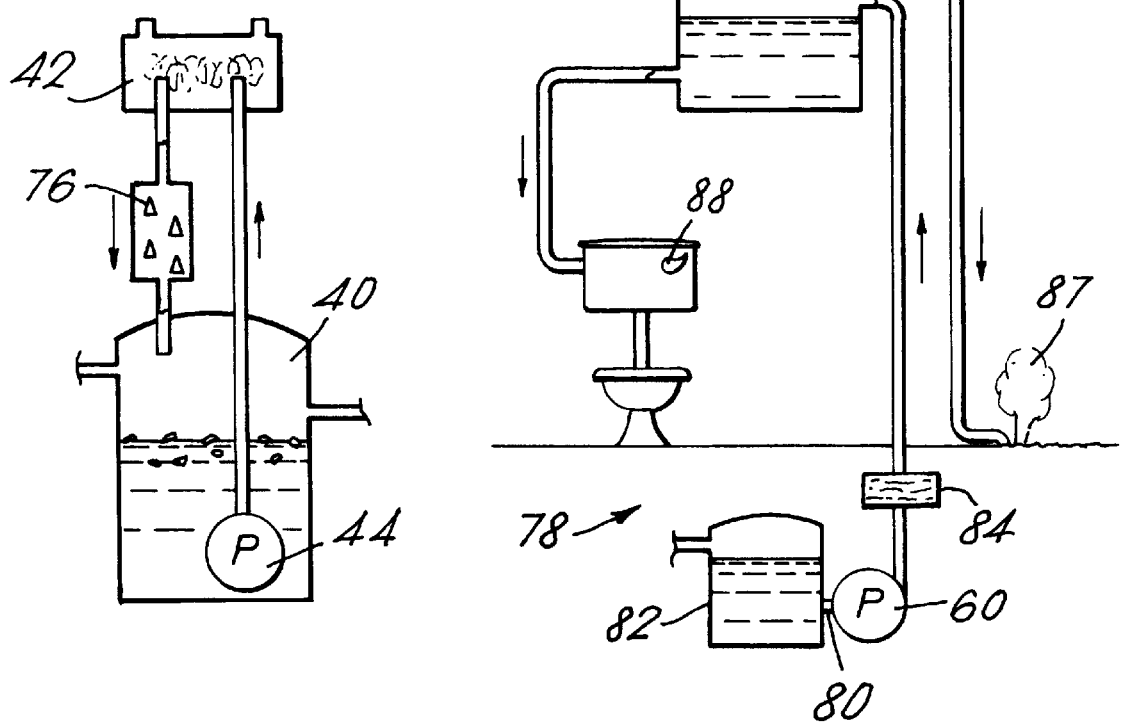
Fig.3.
Fig.4.

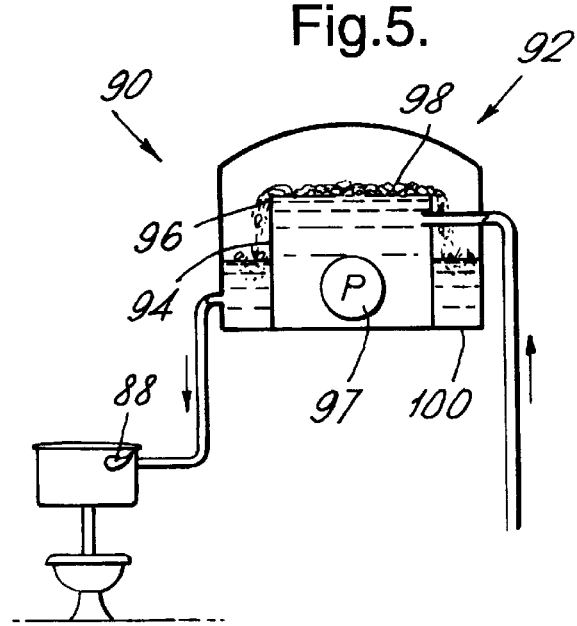
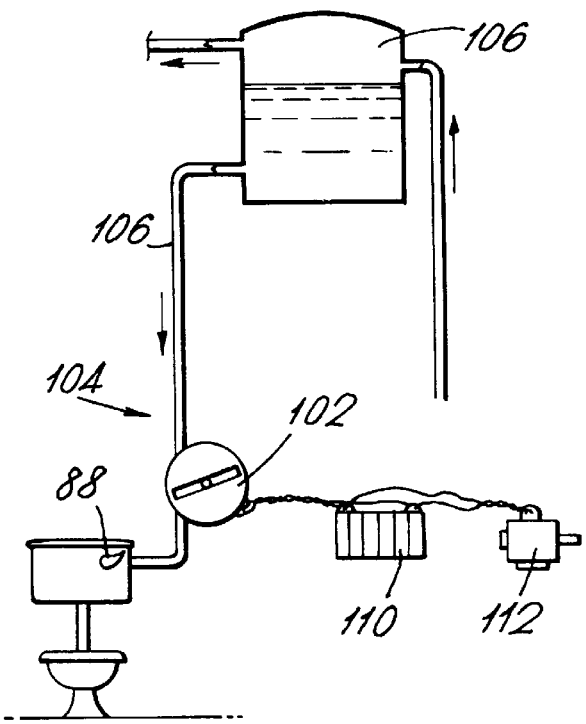
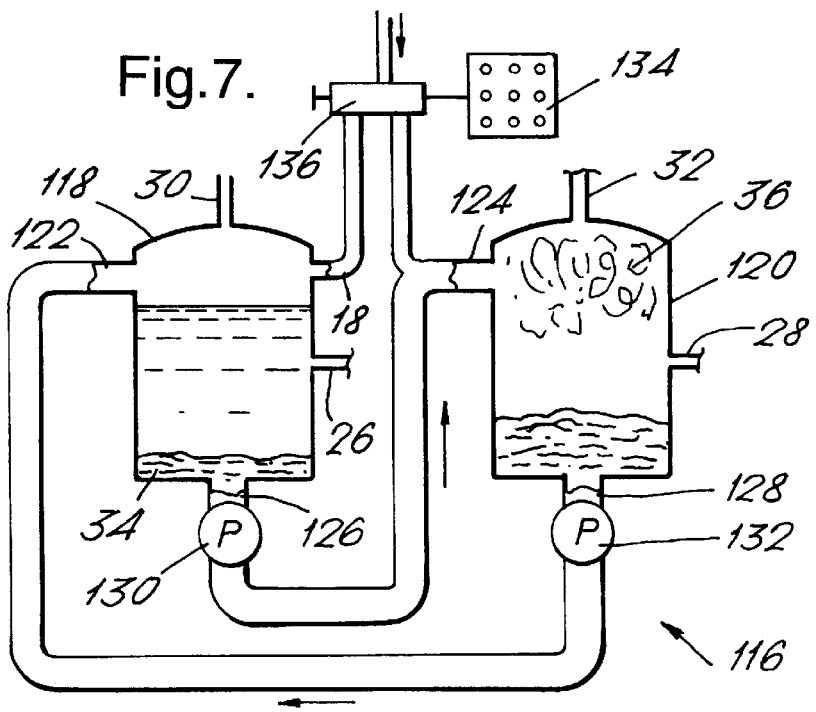

– 1 –
SYSTEM FOR PURIFICATION OF DOMESTIC HOUSEHOLD EFFLUENT

TECHNICAL FIELD

The present invention relates to purification of household effluent. More particularly, the invention provides a process and a system to purify effluents from a building or groups of buildings housing up to several hundred families, such purification being sufficient for purposes of toilet flushing, and permitted disposal of surplus water into available drainage conduits, while eliminating biologically degradable solids.

BACKGROUND ART

Nearly all prior art sewage purification systems require that sooner or later the system be closed down to allow removal of sludge that has not been fully treated and has accumulated in the processing vessels. Large municipal treatment plants have the equipment and personnel to carry out this work. However, small-scale systems intended for the use of a single house or housing blocks are better served by arrangements that almost completely dispose of organic solids and so do not require such servicing.

As is known, environmental regulations are becoming increasingly stringent, and the legal disposal of wastes, whether as solids, liquids or even as gases, is becoming increasingly difficult and expensive.

It is known that, besides carbon dioxide and minor quantities of other gases, methane is produced during the decomposition of sludge material. Typically, 0.35 m$^3$ methane becomes available per kilogram of sludge decomposed. In the U.S., methane produced by cattle and expelled through their digestive systems is considered such an environmental nuisance that Congress has funded research to see what, if anything, can be done about this. Interestingly, methane has a higher heat value than any other common fuel gas, except for hydrogen. However, in almost all prior art systems, generated methane is discharged into the atmosphere, causing an unpleasant odor. In some localities municipal regulations prohibit discharge of such gases.

Methods and apparatus for treating domestic effluents are disclosed in U.S. Pat. No. 4,172,034 (Carlsson, et al); U.S. Pat. No. 4,812,237 (Cawley); U.S. Pat. No. 5,114,586 (Humphrey) and U.S. Pat. No. 5,342,523 (Kuwashima).

Carlsson describes an apparatus which operates on an easy-flowing slurry, having a dry solids content of between 1–15%, preferably 5–10%. Such a dilute slurry unnecessarily extends processing time to achieve aerobic degradation in a reaction vessel with aeration; however, the Carlsson apparatus has the advantage of being compact.

Humphrey discloses a complex sanitation system provided with many vessels, five of which have multiple air entry orifices. The resulting high air consumption necessitates the installation of a large air blower or compressor, leading to high running costs and a noise suppression problem. Another difficulty encountered in the Humphrey system is finding space in a residential building for all the described system components.

Cawley describes and claims a process for purifying and recycling household waste waters, comprising the steps of (a) collecting a first wastewater stream from household kitchen sources; (b) anaerobically digesting said first wastewater stream in a first septic tank; (c) collecting a second wastewater stream from household laundry and bathing sources; (d) combining water from steps (b), (c) and (h); (e) anaerobically digesting water from step (d) in a second septic tank; (f) pumping water from step (e) over a biological sand filter under aerobic conditions; (g) pumping biologically filtered water from step (f) through an ultra-filter, thereby separating the biologically filtered water into a retentate stream and a permeate stream; (h) returning said retentate stream to step (d); (i) disinfecting said permeate stream; (j) returning a first portion of said disinfected permeate stream to household laundry and bathing facilities; (k) separating a second portion of said disinfected permeate stream into a low salt portion and a high salt portion; (l) returning said low salt portion to a household kitchen; and (m) disposing of said high salt portion.

Kuwashima proposes a pair of separator tanks which are used alternately for separating floating or sedimenting material; the organic material is transferred for aerobic decomposition to a third tank. The device lacks means for breaking up large solids into small particles for efficient decomposition.

DISCLOSURE OF THE INVENTION

With this state of the art in mind, one of the objects of the present invention is to obviate the disadvantages of prior-art small-scale effluent treatment systems and to provide a system and process which internally eliminates organic solids to an—extent that under normal use manual disposal of residues will not be required in under ten years of operation if at all.

It is a further object of the present invention to reduce the water consumption of a family in a building provided with such a system. Such reduction is reflected not only in water use charges, but also in lower charges for disposal of sewage, as the latter is often calculated as a proportion of water use charges.

Yet a further object of the present invention is to eliminate the nuisance caused by discharging methane into the atmosphere, and to reduce energy consumption expenses by utilizing gases generated during decomposition processes as fuel for powering at least one of the pumps used in the system.

The present invention achieves the above objects by providing a system for treatment and purification of domestic household effluent, and for the elimination within said system of organic solid wastes, comprising means for separately collecting first and second constituents of the sewage of a domestic residential unit, lavatory sewage comprising said first sewage constituent, and bath, shower, wash basin, laundry, kitchen sink sewage and the like comprising said second sewage constituent, a first and a second dual-purpose vessel, each vessel having at least one inlet and at least one outlet port and being arranged so that during the time period that one of said vessels receives said first sewage constituent and acts as a collector and settling tank, the remaining vessel operates as an anaerobic reaction vessel, the vessel operating as an anaerobic reaction vessel carrying out a decomposition process during which the volume of sludge contained therein is greatly reduced by conversion to compost and gas, a gas outlet being provided at the top of each of said vessels for the collection thereof, first valve means for directing said first sewage constituent to whichever dual-purpose vessel is currently used as a collector and settling tank and for isolating the remaining dual-purpose vessel to convert the same to operate as an anaerobic reaction vessel, at least one aerobic reaction vessel connected to receive an aqueous slurry containing floating organic solids from said first sewage constituent from said collector and settling tank, wherein the solid content is maintained at about 15–35%, the reaction being carried out at a temperature of between −6° C. to 92° C. while said slurry is maintained at a flowable constituency, at least one aerator connected to said aerobic reaction vessel for oxygenating said slurry, first pumping means, powered at least in part by gas generated in said anaerobic reaction vessel, for repeatedly driving said slurry from said aerobic reaction vessel through said aerator, to maintain the oxygen level in said aerobic reaction vessel at at least 1 p.p.m, a separation and settling vessel for receiving therein aerated and bio-aerobic reacted slurry from said aerobic reaction vessel, a first filtered outlet for removing purified water from said separation vessel, a second outlet means for pumping settled slurry particles from said separation and settling vessel to said dual-purpose collector and settling vessel, a lower storage vessel receiving said second constituent, upper storage vessel providing water for toilet flushing, and second pumping means for transferring said second constituent from said lower storage vessel to said upper storage vessel.

In a further embodiment of the invention there is provided a treatment and purification system wherein said upper storage vessel is provided with a first water-receiving container having an open upper rim over which flows foam floating on water in said vessel together with overflow water therefrom, which overflow water and foam are then used for toilet flushing.

Yet further embodiments of the invention will be described hereinafter.

The present invention also provides for a method for the treatment and purification of domestic household effluent, and for the elimination within said system of organic solid wastes, comprising:

a. separately collecting as a first constituent the lavatory sewage of a domestic residential unit, and as a second constituent the bath, shower, wash basin, laundry, kitchen sinks sewage;

b. providing a first and a second dual-purpose vessel, each vessel having at least one inlet and at least one outlet port and being arranged so that during the time period that one of said vessels receives said first sewage constituent and acts as a collector and settling tank, the remaining vessel operates as an anaerobic reaction vessel, the vessel operating as an anaerobic reaction vessel carrying out a decomposition process during which the volume of sludge contained therein is greatly reduced by conversion to compost and gas, a gas outlet being provided at the top of each of said vessels for the collection thereof;

c. providing first valve means for directing said first sewage constituent to whichever dual-purpose vessel is currently used as a collector and settling tank and for isolating the remaining dual-purpose vessel to convert the same to operate as an anaerobic reaction vessel;

d. providing at least one aerobic reaction vessel connected to receive an aqueous slurry containing floating organic solids from said collector and settling tank, wherein the solid content is maintained at about 15–35%, the reaction being carried out at a temperature of between −6° C. to 92° C. while said slurry is maintained at a flowable constituency;

e. providing at least one aerator connected to said aerobic reaction vessel for oxygenating said slurry;

f. providing first pumping means, powered at least in part by gas generated in said anaerobic reaction vessel, for repeatedly driving said slurry from said aerobic reaction vessel through said aerator, to maintain the oxygen level in said aerobic reaction vessel at at least 1 p.p.m;

g. providing a separation and settling vessel for receiving therein aerated and bio-aerobic reacted slurry from said aerobic reaction vessel; said separation vessel having a first filtered outlet for removing purified water therefrom and having a second outlet means for pumping settled slurry particles from said separation and settling vessel to said dual-purpose collector and settling vessel;

h. providing a lower storage vessel receiving said second constituent;

i. providing an upper storage vessel providing water for toilet flushing; and j. providing second pumping means for transferring said second constituent from said lower storage vessel to said upper storage vessel.

In preferred embodiments of the present invention the reaction in the aerobic reaction vessel is carried out at a temperature of between 16 and 42° C.

In especially preferred embodiments of the present invention there is provided a treatment and purification system, further comprising means for collecting, at source, a third kitchen water constituent and passing said kitchen water constituent through a stripping unit for separating organic and other waste components therefrom. Said preferred embodiments preferably also comprise means for feeding said separated organic and other waste components from said kitchen-water constituent to one of said dual-purpose vessels. In this manner garbage disposal units can be installed in the kitchen sinks with the knowledge that the effluent thereof will not block drainage systems since the waste components will be processed and directed to one of said dual-purpose vessels to undergo an anaerobic decomposition in said embodiment, said dual purpose vessels are provided with cellulose digesting bacteria which do not interfere with the anaerobic bacteria found therein and work.

It will be realized that substantial savings can be achieved in planning residential neighborhoods with the elimination of a sewage piping network. Householders will save paying for water for directed use and by not being charged for sewage disposal. A saving of 60 liters of water per day, per person, can be expected. High quality water will thus be preserved for those uses that require the same, mainly for drinking, food preparation and washing.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

In the drawings:

FIG. 2 is a schematic view of part of the same system showing the utilization of generated gas;

FIG. 3 is a schematic view of part of a second embodiment of a purification system showing size reduction components;

FIG. 4 is a schematic view of part of a third embodiment of a purification system further provided with filter means;

FIG. 5 is a schematic view of part of a preferred embodiment of a purification system having a special arrangement of the upper storage vessel;

FIG. 6 is a schematic view of part of an embodiment generating electricity by use of a water turbine;

FIG. 7 is a schematic view of part of a further embodiment of a purification system further provided with sludge transfer means;

DESCRIPTION OF PREFERRED EMBODIMENTS

Figure 1:
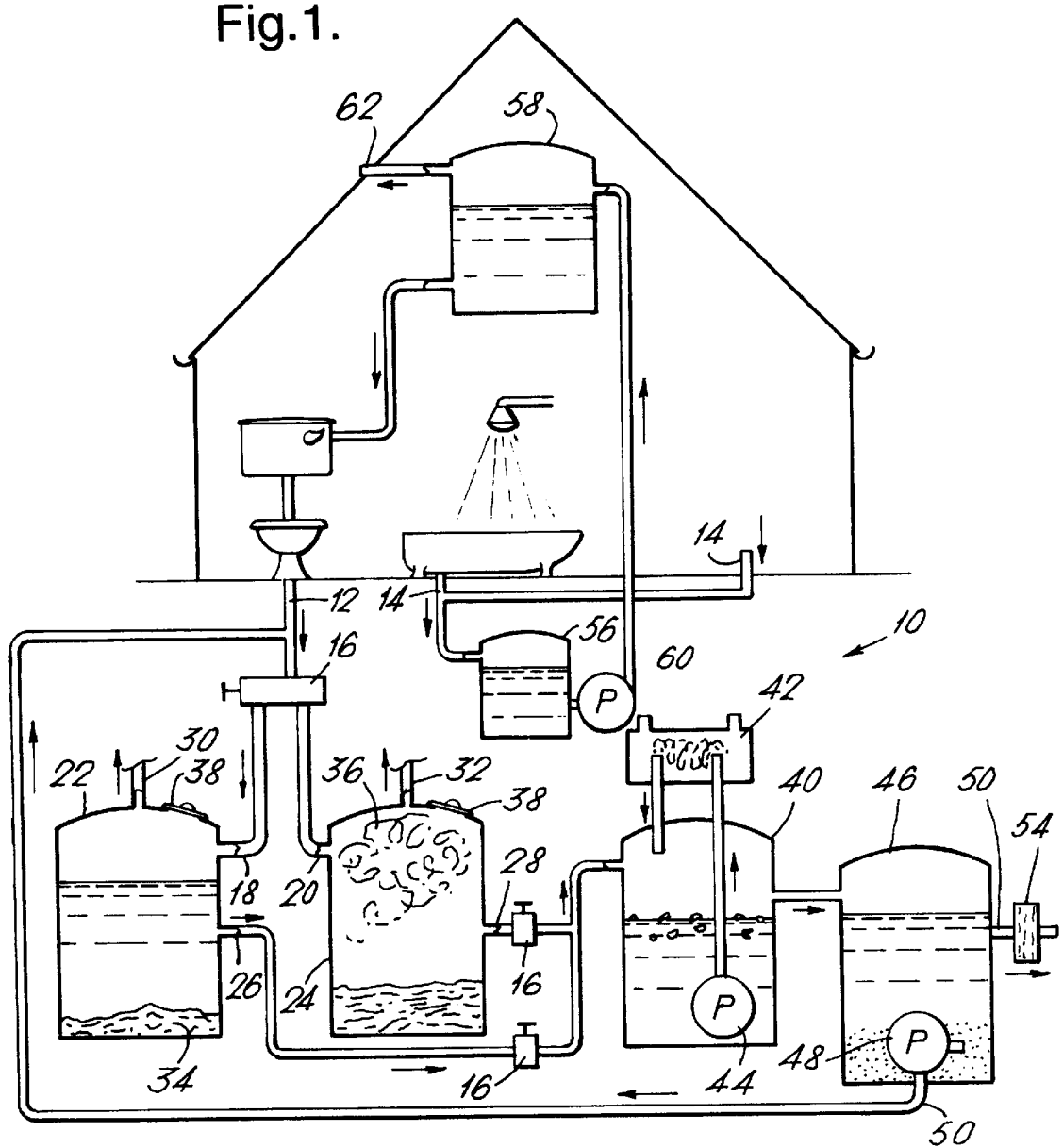
FIG. 1 is a schematic view of a preferred embodiment of the purification system according to the invention.

There is seen in FIG. 1 a system 10 for treatment and purification of domestic household effluent, and for the elimination within said system of organic solid wastes.

Separate drainage means 12, 14 are provided for separately collecting first and second constituents of the sewage of a domestic residential unit. Lavatory sewage comprises the first sewage constituent, and bath, shower, wash basin, laundry, kitchen sink sewage and the like comprises the second sewage constituent.

Drainage means 12 are connected to first valve means 16 which in turn is connected to the inlet ports 18, 20 of a first and a second dual-purpose vessel 22, 24. Each of these vessels is also provided with two outlet ports 26, 28, 30, 32, and are identical to each other in construction. By use of first valve means 16 the vessels 22, 24 are arranged to have alternate functions; during the time period that the vessel 22, for example, acts as a collector and settling tank, the remaining vessel 24 operates as an anaerobic reaction vessel for generating compost.

The vessel 24 operates as an anaerobic reaction vessel when isolated by first valve means 16 and 20, and carries out a decomposition process during which the volume of sludge 34 contained therein is greatly reduced. The upper outlet port 32 comprising a one-way valve (not shown), is used for the removal of fuel gas 36 generated during the decomposition process. Utilization of gas 36 will be described with reference to FIG. 2. A gas-tight charging door 38 is provided in vessels 22, 24 so that biologically degradable material, for example animal excrement, can be loaded during start-up.

First valve means 16 directs the first sewage constituent to whichever dual-purpose vessel, 22 in the present example, is currently used as a collector and settling tank. First valve means 16 are operated when a substantial quantity of solids have accumulated in the vessel 22 being currently used as a collector and settling tank. The time period between successive operations of valve means 16 exceeds one year, and is typically three years, under normal operating conditions.

An aerobic reaction vessel 40 is connected to receive an aqueous slurry containing floating organic solids from the collector and settling tank 22. The solid content therein is maintained at about 15–35%, the reaction being carried out at a temperature of between −6° C. to 92° C. The slurry is maintained at a flowable constituency.

An aerator 42 is connected to the vessel 40 for oxygenating the slurry. The high solid content stated makes for efficient aeration. The wide temperature range permitted corresponds to the survival temperature of active bacteria which cause decomposition of organic wastes.

First pumping means 44, such as a centrifugal immersion pump, repeatedly drives slurry from the aerobic reaction vessel through aerator 42 to maintain the oxygen in vessel 40 at at least 1 ppm. First pumping means 44 is powered at least in part by gas generated in the anaerobic reaction vessel 24.

Advantageously first pumping means 44 are arranged to cause vigorous agitation to effect size reduction of suspended solids in the slurry. A simple method of achieving this end is to use a powerful pump engine and to drive the pump at a speed in excess of that needed with regard to the requirements of aeration alone.

A separation vessel 46 receives aerated and bio-aerobic reacted slurry from the aerobic reaction vessel 40.

Further settling and solid particle aggregation takes place in this vessel.

A sludge pump 48 capable of handling such material transfers same through a second outlet means 50 provided for pumping such particles from separation vessel 46 via first valve means 16 to dual-purpose collector and settling vessel 22, in the shown example.

A first filtered outlet 52 is provided for removing purified water from the separation vessel 46. Advantageously the filter 54 is provided with means for automatically clearing filter plate blockages. The quality of the purified water is determined by the quality of the filter unit 54.

A lower storage vessel 56 connected to drainage means 14 receives the second constituent.

An upper storage vessel 58 provides water for toilet flushing. Vessel 58 is fed by means of second pumping means 60 which transfers water from the lower storage vessel 56. Water in excess of that required for toilet flushing is sufficiently purified to be passed to drainage 62. If vessel 58 requires more water than provided by the system at any particular time, then additional water can be provided to the upper storage vessel 58 from the water main (not shown).

With reference to the rest of the figures, similar reference numerals have been used to identify similar parts.

Referring now to FIG. 2, there is seen a detail of the same treatment and purification system 10 described with reference to FIG. 1.

Gas 36 is produced in the dual purpose vessels (only one of which, 24, is shown) and is collected in tank 64, compressed in compressor 66, stored in tank 68 at compressed pressure, and used at least in part to power first pumping means 44 which drives slurry through the aerator 42. System 10 thus operates while requiring less electricity, and more important in urban areas, reduces the generation of unpleasant odors.

The primary component, typically 57–67% of the generated gas, is methane. The remainder is almost all carbon dioxide. The heating value of such a gas mixture is about 5000 to 6500 kcal/cubic meter. The compressed gas is fed into an internal combustion engine 70 having enhanced protection against internal corrosion. Engine 70 is connected to first pumping means 44, which in turn is also connected to be driven by an electric motor 72 when gas 36 is for any reason unavailable, for example during start up. Alternatively, or in addition, said gas can be converted to electricity, or be used in a burner for directly heating water.

FIG. 3 shows a detail of a second embodiment of a purification system 74 having components for size reduction of solids contained in the first sewage constituent.

Pumped slurry is repeatedly impacted against an array of stationary cutter blades 76 to effect size reduction of suspended solids in the slurry moving around the aeration circuit. Particle size is thereby advantageously reduced to a size of up to 1.5 millimeters, the resultant increase in solids exposed surface area leading to effective aeration.

Seen in FIG. 4 is a detail of a third embodiment of a purification system 78 provided with further filter means.

The water outlet port 80 of the lower storage vessel 82 is connected to a filter 84 for the removal of solids from water passing therethrough. Water passing the filter is stored in the upper storage vessel 86 and is used for toilet flushing. Excess water is available for horticultural purposes 87.

While there is no objection to the inclusion of small solids for flushing, it is nevertheless advantageous to remove such solids to prevent malfunctioning of the flush tank mechanism 88.

Referring now to FIG. 5, there is seen part of a preferred embodiment of a purification system 90 having a special arrangement of the upper storage vessel 92.

An upper storage vessel 92 is provided with a first water-receiving container 94 having an open upper rim 96. Water in the container 94 includes fats, soaps and detergents which originated in the second sewage constituent. A pump 97 agitates the water in the container 94, and causes foaming. The foam 98 floats on the water in the container 94, and together with overflow water therefrom, flows down into the tank 100. Overflow water and foam 98 is withdrawn from the tank 100 as needed for toilet flushing.

Shown in FIG. 6 is an embodiment generating electricity by use of a water turbine 102.

A treatment and purification system 104 generates electricity for use in the system, by means of a turbine 102 in a water pipe 106 leading down upper storage vessel 108. Rechargeable electric batteries 110, connected to a pump motor 112, provide power storage, so that first pumping means 44, seen in FIG. 1, can be operated when gas or mains power is unavailable. In additional embodiments (not shown) supplementary electricity is generated by solar cells or by a windmill, the choice depending on which is the more suitable for the location in which the system is to be installed.

Referring now to FIG. 7, there is depicted a detail of an embodiment of the treatment and purification system 116 having provision for the transfer of sludge 34. The first and second dual-purpose vessels 118, 120 are provided with an additional inlet 122, 124 to receive, and an additional lower outlet 126, 128 to discharge sludge 34 accumulating at the bottom of vessels 118, 120. Each vessel is provided with a pump 130, 132 capable of handling such material. Sludge transfer is effected from the dual-purpose vessel (for example 122) to be used for storage and settling to the vessel (124 in the present example) to be used for anaerobic decomposition. In the present embodiment activation of the appropriate pump (130 in this example) is effected through a control panel 134 and is automatically triggered by movement of first valve means 136.

Figure 8:
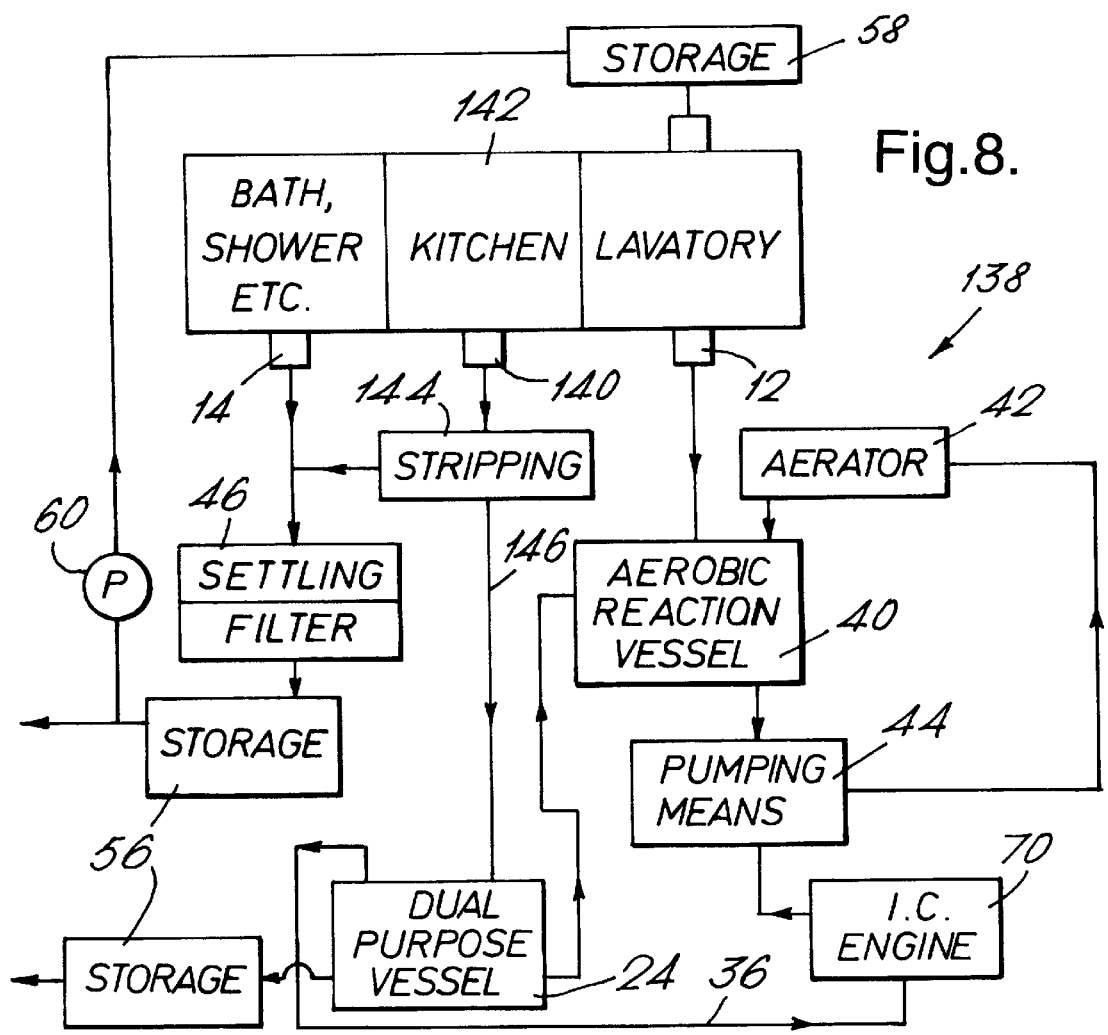
FIG. 8 is a schematic view of part of a further purification system provided with means for collecting a kitchen-water constituent and separating waste components therefrom.

Referring now to FIG. 8, there is seen a block diagram representation of a system 138 comprising means 140 for separately collecting at source a third kitchen-water constituent 142 which is passed through a stripping unit 144, which can be either a static or dynamic filtering unit for separating organic and other waste components 146 therefrom. In said figure the remaining components are the same as those described with reference to FIGS. 1 and 2.

As will be realized, water exiting filter and settling unit 46 and entering storage 56 can not only be recycled by pump 60 for lavatory use, but can also exit the system to be available for other uses, depending on water purity.

As stated hereinbefore, such an arrangement enables the effective use of garbage-disposal units installed in kitchen sinks.

In this embodiment dual purpose vessel 24 is provided not only with anaerobic bacteria, but also with cellulose-consuming bacteria such as Trichonympha, which can function in conjunction with said anaerobic bacteria without either interfering with the other.

Figure 9:
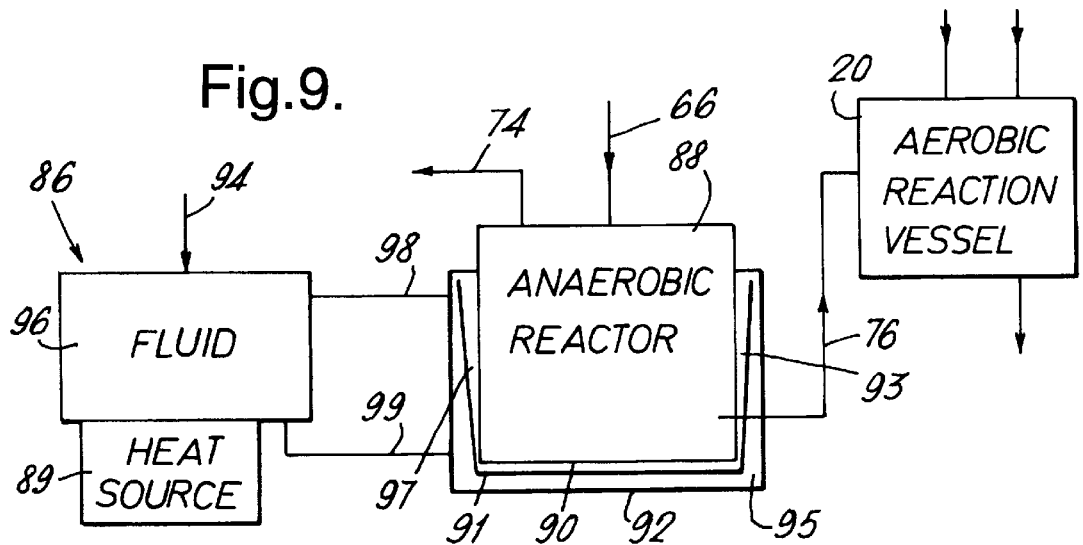
FIG. 9 is a block diagram of an embodiment, wherein the anaerobic tank is heated.

FIG. 9 depicts a part of a further system 86, similar to that described above with reference to FIG. 1, however, speeding up the anaerobic decomposition process. An anaerobic decomposition reactor 88 is provided with a spaced-apart triple wall 90, 91, 92, forming two concentric outer compartments 93 and 95 around each of said vessels 88 for introduction therein of fluids for regulating the temperature within said vessels. Preferably, compartment 93 adjacent to said vessel 88 is filled with an oil fluid 97 and compartment 95 is connected by inlet and outlet conduits 98, 99 to a source 94 of aqueous fluid 96 for heating the reactor 88, which fluid is heated by a heat source 89. Heat can be provided either electrically, or by burning a fuel, suitably some of the methane 74 produced in the reactor 88. The heating of the reactor 88 speeds up the decomposition process and also enables the decomposition of materials which do not disintegrate significantly at room temperature. This arrangement is also preferred for systems installed in cold climates. In addition, the rate of decomposition within reactor 88 can be regulated by controlling the temperature of aqueous fluid 96 introduced into compartment 95, which aqueous fluid then serves to heat or cool oil fluid 97, which in turn heats or cools the contents of reactor 88, hot water being removable from compartment 95 and being replaceable by cooler aqueous fluid as desired, optionally using further inlet and outlet conduits (not shown).

It is to be noted that the conduits interconnecting the various components of the system and leading therefrom can be formed as double-wall conduits and the system can further comprise means for introducing heated water between the inner and outer walls of said conduits to heat the contents of the fluids flowing therethrough.

In addition, the gas produced in reactor 88 can be fed to a burner for heating water to be circulated between the inner and outer walls of said conduits, which heated water can also be introduced under pressure into said conduits to flush the same when necessary.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for treatment and purification of domestic household effluent, and for the elimination within said system of organic solid wastes, comprising:

means for separately collecting first and second constituents of the sewage of a domestic residential unit, lavatory sewage comprising said first sewage constituent, and bath, shower, wash basin, laundry, kitchen sink sewage and the like comprising said second sewage constituent;

a first and a second dual-purpose vessel, each vessel having at least one inlet and at least one outlet port and being arranged so that during the time period that one of said vessels receives said first sewage constituent and acts as a collector and settling tank, the remaining vessel operates as an anaerobic reaction vessel, the vessel operating as an anaerobic reaction vessel carrying out a decomposition process during which the volume of sludge contained therein is greatly reduced by conversion to compost and gas, a gas outlet being provided at the top of each of said vessels for the collection thereof;

first valve means for directing said first sewage constituent to whichever dual-purpose vessel is currently used as a collector and settling tank and for isolating the remaining dual-purpose vessel to convert the same to operate as an anaerobic reaction vessel;

at least one aerobic reaction vessel connected to receive an aqueous slurry containing floating organic solids from said collector and settling tank, wherein the solid content is maintained at about 15–35%, the reaction being carried out at a temperature of between −6° C. to 92° C. while said slurry is maintained at a flowable constituency;

at least one aerator connected to said aerobic reaction vessel for oxygenating said slurry;

first pumping means, powered at least in part by gas generated in said anaerobic reaction vessel, for repeatedly driving said slurry from said aerobic reaction vessel through said aerator, to maintain the oxygen level in said aerobic reaction vessel at at least 1 p.p.m;

a separation and settling vessel for receiving therein aerated and bio-aerobic reacted slurry from said aerobic reaction vessel;

a first filtered outlet for removing purified water from said separation vessel;

a second outlet means for pumping settled slurry particles from said separation and settling vessel to said dual-purpose collector and settling vessel;

a lower storage vessel receiving said second constituent;

an upper storage vessel providing water for toilet flushing; and second pumping means for transferring said second constituent from said lower storage vessel to said upper storage vessel.

2. A treatment and purification system according to claim 1, wherein said first pumping means is arranged to cause vigorous agitation to effect size reduction of suspended solids in said slurry.

3. A treatment and purification system according to claim 1, wherein pumped slurry is impacted against an array of cutter blades to effect size reduction of suspended solids in said slurry.

4. A treatment and purification system according to claim 1, wherein an outlet port of said lower storage vessel is connected to a filter for the removal of solids from water passing therethrough.

5. A treatment and purification system according to claim 1, wherein the time period between successive operations of said valve means exceeds one year under normal operating conditions.

6. A treatment and purification system according to claim 1, wherein said upper storage vessel is provided with a first water-receiving container having an open upper rim over which flows foam floating on water in said vessel together with overflow water therefrom, which overflow water and foam is then used for toilet flushing.

7. A treatment and purification system according to claim 1, wherein electricity is generated, by means of a turbine in a water pipe descending from said upper storage vessel.

8. A treatment and purification system according to claim 1, wherein each said dual-purpose vessel is provided with an inlet to receive sludge accumulating at the bottom of the remaining dual-purpose vessel.

9. A treatment and purification system according to claim 1, further comprising means for collecting, at source a third kitchen water constituent, and passing said kitchen water constituent through a stripping unit for separating organic and other waste components therefrom.

10. A treatment and purification system according to claim 9, comprising means for feeding said stripped kitchen water constituent through a filtering unit for directed use.

11. A treatment and purification system according to claim 9, comprising means for feeding said separated organic and other waste components to one of said dual-purpose vessels and subjecting the same to an anaerobic decomposition process to produce methane from components thereof.

12. A treatment and purification system according to claim 11, wherein said dual purpose vessels are provided with cellulose-consuming bacteria.

13. A treatment and purification system according to claim 1, wherein said dual purpose vessels are each provided with a spaced-apart triple wall forming two concentric outer compartments around each of said vessels for introduction therein of fluids for regulating the temperature within said vessels.

14. A treatment and purification system according to claim 13, wherein a compartment formed adjacent to said vessel is filled with an oil fluid and wherein the outermost compartment is provided with means for introducing and removing aqueous fluid.

15. A treatment and purification system according to claim 14, wherein said aqueous fluid is water heated by burning gas produced by one of said vessels.

16. A treatment and purification system according to claim 1, comprising a plurality of double-wall conduits interconnecting various components of said system and leading therefrom, and further comprising means for introducing heated water between the inner and outer wall of said conduits to heat the content of fluids flowing therethrough.

17. A method for the treatment and purification of domestic household effluent, and for the elimination within said system of organic solid wastes, comprising:

a. separately collecting as a first constituent the lavatory sewage of a domestic residential unit, and as a second constituent the bath, shower, wash basin, laundry, kitchen sinks sewage;

b. providing a first and a second dual-purpose vessel, each vessel having at least one inlet and at least one outlet port and being arranged so that during the time period that one of said vessels receives said first sewage constituent and acts as a collector and settling tank, the remaining vessel operates as an anaerobic reaction vessel, the vessel operating as an anaerobic reaction vessel carrying out a decomposition process during which the volume of sludge contained therein is greatly reduced by conversion to compost and gas, a gas outlet being provided at the top of each of said vessels for the collection thereof;

c. providing first valve means for directing said first sewage constituent to whichever dual-purpose vessel is currently used as a collector and settling tank and for isolating the remaining dual-purpose vessel to convert the same to operate as an anaerobic reaction vessel;

d. providing at least one aerobic reaction vessel connected to receive an aqueous slurry containing floating organic solids from said collector and settling tank, wherein the solid content is maintained at about 15–25%, the reaction being carried out at a temperature of between $-6°$ C. to $92°$ C. while said slurry is maintained at a flowable constituency;

e. providing at least one aerator connected to said aerobic reaction vessel for oxygenating said slurry;

f. providing first pumping means, powered at least in part by gas generated in said anaerobic reaction vessel, for repeatedly driving said slurry from said aerobic reaction vessel through said aerator, to maintain the oxygen level in said aerobic reaction vessel at at least 1 p.p.m;

g. providing a separation vessel for receiving therein aerated and bio-aerobic reacted slurry from said aerobic reaction vessel; said separation vessel having a first filtered outlet for removing purified water therefrom and having a second outlet means for pumping slurry particles from said separation vessel to said dual-purpose collector and settling vessel;

h. providing a lower storage vessel receiving said second constituent;

i. providing an upper storage vessel providing water for toilet flushing; and j. providing second pumping means for transferring said second constituent from said lower storage vessel to said upper storage vessel.

18. A method according to claim 17, comprising separately collecting, at source, a third kitchen water constituent and passing said kitchen water constituent through a stripping unit for separating organic and other waste components therefrom.

19. A method according to claim 18, further comprising feeding said separated organic and other waste components from said kitchen water to one of said dual-purpose vessels.

* * * * *